Oct. 18, 1960 M. GREIF 2,956,902
PRIMER COATING COMPOSITION CONTAINING A POLYMER
PREDOMINATELY OF VINYL ACETATE
Filed April 30, 1957
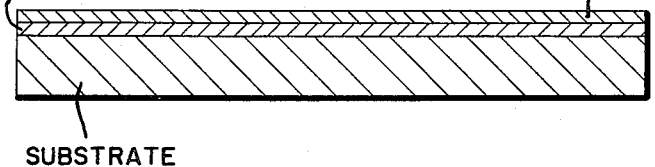
INVENTOR
MORTIMER GREIF
BY
AGENT

2,956,902

PRIMER COATING COMPOSITION CONTAINING A POLYMER PREDOMINATELY OF VINYL ACETATE

Mortimer Greif, Havertown, Pa., assignor to E. I. du Pont de Nemours and Company, Wilmington, Del., a corporation of Delaware Filed Apr. 30, 1957, Ser. No. 656,032

16 Claims. (Cl. 117—75)

This invention relates to a coating composition. More particularly, this invention relates to an alkyd resin/amino-aldehyde resin coating composition containing a polymer of vinyl acetate and to a finishing system containing an undercoat of the aforementioned composition and a superposed topcoat of methyl methacrylate lacquer.

Methyl methacrylate lacquers, that is coating compositions containing a solvent and as the principal film-forming constituent a polymer of methyl methacrylate, can be applied to substrates and dried to form films or coatings which have outstanding durability and gloss retention. Unfortunately, such coatings do not have adequate metal protecting and rust-inhibiting properties for protecting metal articles which are to be used outdoors, such as, for example, steel automobile bodies. It is, therefore, necessary to apply a protective coating to such articles before applying a topcoat of methyl methacrylate lacquer.

The undercoat which is applied before the methyl methacrylate lacquer to provide metal protection and inhibit rusting is known as a primer and the dry coat resulting from the application of such a material is commonly referred to as the primer coat or prime coat. The conventional primers such as those commonly used under alkyd resin enamels, amino-aldehyde enamels and nitrocellulose lacquers are not satisfactory as prime coats for methyl methacrylate lacquers. Methyl methacrylate topcoats applied over these conventional prime coats crack and do not adhere well, particularly when thick films of methyl methacrylate lacquer are used. The adhesion of methyl methacrylate topcoats to conventional primers is particularly poor in recesses and other places that are hard to sand such as around door frames and at the intersections of body panels. Therefore, finishing systems consisting of a conventional metal prime coat and a methyl methacrylate topcoat are not suitable for such uses, for example, as automobile finishes.

Many attempts have been made to improve the adhesion of methyl methacrylate lacquers. One approach has been to coat the prime coat with a sealer, that is a coating which adheres the metal protecting prime coat to the methyl methacrylate topcoat. However, it is expensive to apply an extra coating over the entire coated surface.

I have found a coating composition to which methyl methacrylate lacquers will adhere well without sanding and without a sealer coat. In addition, this coating composition has the excellent metal-protecting and rust-inhibiting properties of conventional primers.

The coating composition of this invention comprises pigment, solvent, and a resin binder having as essential constituents oil-modified alkyd resin, amino-aldehyde resin and about from 1 to 50% by weight of at least one polymer of vinyl acetate. A particularly preferred composition comprises pigment, solvent and a resin binder having as essential constituents about from 60 to 80% by weight of oil-modified alkyd resin, about from 5 to 10% by weight of amino-aldehyde resin, about from 5 to 20% by weight of at least one polymer of vinyl acetate and about from 5 to 10% by weight of esterified epoxy-hydroxy polyether resin.

The accompanying drawing shows an enlarged cross-sectional view of a representative portion of an article coated with the finishing system of this invention.

Any of the conventional alkyd resins used in baking-type coating compositions can be used in the composition of this invention. These resins are usually prepared by heating together a polycarboxylic acid component, a polyol component, and an oil component with or without solvent at a temperature of less than about 300° C. and preferably about from 180° to 250° C. until an alkyd resin having the desired properties is obtained. Typically, such alkyd resins have an oil length of about 30 to 60, an acid number of less than 20 and 2 to 8% of unreacted hydroxyl. Oil length means the percent by weight of fatty oil acid used in preparing the resin calculated as triglyceride and based on the total weight of resin. Percent of unreacted hydroxyl means the percent by weight of glycerol based on the total weight of resin which has an amount of unreacted hydroxyl groups equivalent to that of the resin. As is conventional in the coating art, the unreacted hydroxyl and oil length are based on glycerol whether or not glycerol is used as the polyol. Acid number is the number of milligrams of potassium hydroxide necessary to neutralize the acidity of one gram of alkyd resin.

Polycarboxylic acids such as, for example, oxalic acid, malonic acid, succinic acid, glutaric acid, sebacic acid, adipic acid, pimelic acid, suberic acid, azelaic acid, tricarballyic acid, citric acid, tartaric acid, maleic acid, phthalic acid, terephthalic acid, itaconic acid, citraconic acid, and mixtures thereof can, among others, be used in preparing the alkyd resins employed in the invention. Of course, any of the anhydrides of the aforementioned acids can be used in equivalent amounts in place of the acids. Phthalic acid or anhydride is a preferred constituent of the polycarboxylic acid component.

Typical polyols useful in the alkyd resin are, for example, ethylene glycol, diethylene glycol, dimethylene glycol, tetramethylene glycol, pinacol, trimethylol propane, trimethylol ethane, mannitol, sorbitol, glycerol, pentaerythritol and mixtures thereof. Glycerol is a preferred polyol.

Illustrative oil components are, for example, drying oils such as dehydrated castor oil, tung oil, oiticica oil, linseed oil and perilla oil; semi-drying oils such as soybean oil, menhaden oil and cod-liver oil; non-drying oils such as coconut oil, palm oil, castor oil, and olive oil; fatty acids derivable from the aforementioned oils such as linolenic, linoleic, palmitoleic and oleic acid; and mixtures thereof. Materials such as tall oil can also be used with or in place of the aforementioned oils. Non-drying oils should not be used as the sole constituent of the oil component since primers made therefrom do not form hard durable coatings.

Any of the conventional amino-aldehyde resins which are compatible with the other resins in the composition and soluble in the solvents therefor can be used. Such amino-aldehyde resins are formed by the reaction of polyamines such as, for example, melamine and urea with aldehydes such as, for example, formaldehyde, acetaldehyde, benzaldehyde and furfural. Particularly preferred resins are prepared by reacting urea or melamine with a molar excess of formaldehyde, then etherifying the resulting methylol melamines or methylol ureas with, for example, methyl, ethyl, propyl or preferably, butyl alcohol.

The aforementioned conventional alkyd resins and amino-aldehyde resins and mixtures thereof are described in more detail in U.S. Patents, 2,191,957, 2,197,357 and 2,218,474. Usually, although it is not critical, the alkyd resin and amino-aldehyde resin are used in a weight ratio of about from 95:5 to 60:40.

About from 1 to 50 and preferably 5 to 20% by weight of at least one polymer of vinyl acetate must be added to the resin binder of the composition of this invention so that methyl methacrylate lacquers will adhere well thereto. The term polymer of vinyl acetate and related terms, as used herein, refer to homopolymers and copolymers as well as mixtures of homopolymers, mixtures of copolymers, and mixtures containing both homopolymers and copolymers of vinyl acetate. Typical copolymers of vinyl acetate which can be used in the compositions of this invention are those containing minor amounts, for example, less than about 40% by weight and preferably 5 to 15% by weight, of another ethylenically unsaturated material copolymerizable therewith such as di(2-ethyl hexyl)maleate, dilauryl maleate, dibutyl maleate, distearyl maleate, dipalmityl maleate, vinyl oleate, vinyl stearate, dilauryl itaconate, dilauryl citraconate, di(2-ethyl hexyl)itaconate, di(2-ethyl hexyl) citraconate, vinyl chloride, crotonic acid and mixtures thereof. The molecular weight of the polymers of vinyl acetate is not critical as long as the polymers form films. Generally, however, polymers having a molecular weight of less than about 25,000 and preferably 5000 to 15,000 are used. Such polymers have a Gardner Holdt viscosity in a 50 weight percent solution of toluene of between about M and Z at 25° C.

If desirable, up to about 10% and preferably about from 5 to 10% by weight of esterified epoxyhydroxy polyether resin can be incorporated in the resin binder to improve blister resistance, metal adhesion and general film properties of the composition of this invention; however, this component is not critical, and for many applications, can be omitted.

Typical esterified epoxyhydroxy polyether resins are disclosed in U.S. Patent 2,709,690. These resins are prepared by heating together a polyhydric phenol such as resorcinol, catechol, hydroquinone, bis-(4-hydroxy phenyl)-2,2-propane, 4,4'-dihydroxy benzophenone, bis-(4-hydroxy phenyl) methane or bis-(4-hydroxy-2-methyl phenyl)-2,2-propane with an excess of an epoxy contributing compound such as epichlorohydrin, epibromohydrin or epihalohydrins of mannitol, sorbitol or erythritol, then reacting the resulting polyether resin with about from 25 to 65% of the equivalent quantity of drying oil fatty acid needed to completely esterify the polyether. Illustrative drying oil fatty acids are those derived from linseed oil, soybean oil, perilla oil, tung oil, walnut oil, oiticica oil or dehydrated castor oil.

Any of a wide variety of aliphatic, cycloaliphatic and aromatic hydrocarbons, alcohols, ketones, ethers and esters, such as, for example, xylene, toluene, Cellosolve, Cellosolve acetate, diacetone alcohol and butyl ether can be used as solvents for the coating compositions. Solvents boiling between 110 and 175° C. are preferred.

Metal oxides, hydroxides, chromates, silicates, sulfides, sulfates and carbonates, carbon blacks, organic dyestuffs and lakes thereof and metal flake pigments are, among others, suitable pigments which can be used in the coating compositions of this invention.

Although some improvement in methyl methacrylate lacquer adhesion is obtained with the undercoat compositions of this invention at all pigment concentrations commonly used in the undercoating art, particularly good adhesion is obtained if the amount of pigment is kept above the critical pigment volume concentration. The critical pigment volume concentration of a pigment/binder system is that point at which just sufficient binder is present to fill completely the voids left between the pigment particles after volatilization of the thinner. A description and method of calculation of the critical pigment volume concentration is given by W. K. Asbeck, D. D. Laiderman and M. Van Loo in the Official Digest of the Federation of Paint and Varnish Production Clubs, No. 326, page 156 et seq. (March 1952). This critical value varies with each pigment or pigment mixture which is used in the coating composition.

Other conventional modifiers for coating compositions such as inhibitors, dispersing agents, flow-control agents, drying accelerators and the like can be added in amounts conventionally used in the coating art.

The composition of this invention is preferably prepared by grinding the pigment and polymer of vinyl acetate together with or without diluent in a paint mill or similar mixing apparatus to form a mill base, then mixing the resulting product with the alkyd resin, amino-aldehyde resin and other ingredients. Part of the other resin components, such as part of the alkyd resin, can be ground with the polymer of vinyl acetate and pigment in the mill base.

The finished coating composition of this invention can be applied to the substrate to be coated by any of the standard fluid coating techniques such as flow, dip, spray, brush or roller coating, then baked at about from 30 minutes at 100° C. to 120 minutes at 200° C. and preferably for about 60 minutes at about from 125° to 145° C.

Preferably, the coating composition of this invention is applied directly to a substrate; however, a conventional prime coat can be applied to the substrate then the composition of this invention can be applied over the prime coat. The important requirement is that when the composition of this invention is used in a methyl methacrylate lacquer finishing system as described hereinafter, the lacquer topcoat must be in adherent contact with the composition containing the polymer of vinyl acetate. In addition to being used on metals, the composition of this invention can be used on any substrates not adversely affected by baking operations including for example, glass, ceramics, asbestos, and wood (when moderate baking temperatures are permissible).

Adherent methyl methacrylate lacquer finishing systems are prepared by applying a coat of methyl methacrylate lacquer over the undercoat composition of this invention. The lacquer topcoat can be dried at room temperature or at an elevated temperature which is usually less than that used for the undercoat.

The polymers of methyl methacrylate useful in making the methyl methacrylate lacquers employed in preparing the products of this invention are either homopolymers of methyl methacrylate or copolymers of methyl methacrylate with minor amounts, for example, in order of 2 to 25% by weight, of another material copolymerizable therewith, such as, for example, acrylic acid, methacrylic acid, the 1 to 4 carbon alkyl (i.e., methyl to butyl) esters of acrylic acid, the 2 to 4 carbon alkyl (i.e., ethyl, propyl and butyl) esters of methacrylic acid, vinyl acetate, acrylonitrile, styrene and glycidyl methacrylate. A preferred copolymer contains about 98% of methyl methacrylate and 2% methacrylic acid. The term "polymer of methyl methacrylate" and related terms, as used herein, refer to both homopolymers, mixtures of copolymers and mixtures containing both homopolymers and copolymers.

The preferred methyl methacrylate polymers have a relative viscosity of about from 1.117 to 1.196. Polymers of methyl methacrylate falling within this range of viscosities are preferred because they have a unique solubility and viscosity which makes it possible, for example, to spray thick, smooth lacquer topcoats thereof in a relatively few individual coatings. In addition, dried lacquer topcoats of such polymers have an outstanding balance of properties such as, for example, durability, gloss, and flexibility. Methyl methacrylate topcoat lacquers based on such polymers are disclosed and claimed in copending application Serial No. 434,661, filed June 4, 1954 by Laverne W. Crissey and John H. Lowell. Still other methyl methacrylate topcoat lacquers containing such polymers which are particularly useful for spray application are disclosed and claimed in copending application serial No. 402,498, filed January 6, 1954 by Laverne W. Crissey and John H. Lowell.

The term "relative viscosity," as used herein to specify a property of polymers of methyl methacrylate, is the value obtained by dividing the efflux time of a solution, A, of the polymer of methyl methacrylate by the efflux time of the solvent, B, used in the solution, the efflux times being measured in accordance with the procedure of A.S.T.M.–D–445, 46T—Method B. Polymer solution A is a solution of 0.25 gram of the polymer of methyl methacrylate being tested in 50 cc. of ethylene dichloride, and the solvent B is ethylene dichloride. The efflux times are determined at 25° C. in a standard apparatus currently marketed under the designation of Modified Ostwald Viscosimeter, Series 50.

The polymers of methyl methacrylate used in making the methyl methacrylate lacquers can be prepared according to well known methods by polymerizing methyl methacrylate monomer with or without another monomer copolymerizable therewith either in bulk, in solution, or in granular form to produce products having the required relative viscosity.

Pigments, solvents and modifiers similar to those used in the undercoat composition of this invention can be added to the methyl methacrylate lacquer. Plasticizers such as, for example, benzyl butyl phthalate, dibutyl phthalate, triphenyl phosphate, 2-ethyl hexyl benzyl phthalate and dicyclohexyl phthalate are preferably added to the lacquer.

The undercoat composition of this invention protects metal articles, inhibits rusting and, in general, has good primer properties. Finishing systems employing the undercoat composition of this invention and a methacrylate lacquer topcoat are durable and glossy. By using the composition of this invention, it is possible to firmly adhere thick methyl methacrylate lacquer topcoats to metal articles without sanding the primer and without using a sealer coat.

The following examples are intended to illustrate the invention and not to limit it in any way. Parts and percentages are by weight unless otherwise specified.

EXAMPLE I

*Preparation of primer*

A mill base was prepared by grinding together the following materials:

| | Parts |
|---|---|
| Vinyl acetate copolymer | 19 |
| Alkyd resin | 53 |
| Pigment: | |
| $Fe_2O_3$ | 304 |
| $Al_2O_3.SiO_2$ | 477 |
| Silica | 163 |
| Solvent: | |
| Toluene | 19 |
| Xylene | 44 |
| Aromatic hydrocarbon mixture (boiling range 165–175° C.) | 327 |
| Cresol-inhibitor | 6 |

The invyl acetate copolymer was polymerized from 92% of vinyl acetate and 8% of di(2-ethyl hexyl) maleate and had a Gardner Holdt viscosity of U+¼ at 25° C. in a 50% toluene solution. The alkyl resin was a dehydrated castor oil-modified glycerol phthalate with an oil length of about 40, unreacted hydroxyl equivalent to about 2.0% of glycerol based on the total weight of resin and an acid number of about 8.

About 450 parts of the mill base were next mixed with 112 parts of a 55% solution of the aforementioned alkyd resin in toluene, about 8.7 parts of a 60% solution in butanol of butylated urea-formaldehyde resin and about 20 parts of a 45% solution in xylene of esterified epoxyhydroxy polyether resin. The urea-formaldehyde resin consisted of the butylated reaction product of urea and formaldehyde in a 1:4 mole ratio. A 60% solution of the butylated urea-formaldehyde resin in toluene had a viscosity of about 1500 to 3000 centipoises at 25° C. The epoxyhydroxy polyether resin which was sold under the proprietary name of "Epi-Tex" 1360 by Jones-Dabney Corp. had a Gardner Holdt viscosity of between R and T at 25° C. It was prepared by esterifying the reaction product of epichlorohydrin and bis-(4-hydroxy phenyl)-2,2-propane with dehydrated castor oil.

The composition of this example had the following resin binder formulation:

| | Parts |
|---|---|
| Alkyd resin | 79.0 |
| Urea-formaldehyde resin | 5.3 |
| Vinyl acetate copolymer | 6.4 |
| Epoxyhydroxy polyether resin | 9.3 |
| | 100.0 |

*Preparation of methyl methacrylate lacquer*

A methyl methacrylate lacquer was prepared by mixing the following ingredients then grinding them in a conventional paint mill until a smooth uniform dispersion was obtained.

| | Parts |
|---|---|
| Homopolymer of methyl methacrylate | 71 |
| Benzyl butyl phthalate | 29 |
| Fatty-amine treated montmorillonite clay | 6 |
| Titanium dioxide | 50 |
| Phthalocyanine blue | 5 |
| Solvent | 500 |

The homopolymer of methyl methacrylate used in this lacquer had a relative viscosity of about 1.15 determined by the A.S.T.M.–D–445–46T, Method B described hereinbefore. The solvent consisted of a mixture of Cellosolve acetate, acetone, isopropyl alcohol, xylene and butyl alcohol in about a 3:6:4:6:1 weight ratio.

*Preparation of coated articles*

The undercoat composition described hereinbefore was thinned to 40% solids with an aromatic hydrocarbon solvent mixture having a boiling range of between 167 and 175° C., then sprayed onto a series of steel auto-body panels which had been treated with conventional rust inhibitor ("Bonderite," a product of Parker Rust-Proof Co.) and baked for about 1 hour at 135° C. The baked undercoats ranged in thickness from about 0.3 to 4.0 mils.

The methyl methacrylate lacquer described hereinbefore was sprayed over the baked undercoats, then dried for 30 minutes at 93° C. The dried coatings of methyl methacrylate lacquer ranged from 2 to 3.5 mils in thickness.

*Evaluation of coated article*

Each panel was tested for adhesion of the primer to the metal and adhesion of the topcoat to the primer by cutting two two-inch long marks in the form of an X vertically through the coating down to the metal, securely pressing a strip of pressure-sensitive cellophane adhesive tape over the X, then pulling the adhesive tape off with a force approximately tangential to the coated surface. None of the surface coatings came off during the test, thereby indicating that the finishing system had good adhesion, that is, the topcoat stuck to the undercoat and the undercoat stuck to the panel, and good cohesion, that is, the coatings had good integrity.

When the tip of a knife blade was scraped over the surface of the coated articles, the topcoat did not flake off nor did the individual layers of the multi-layer coating separate when the finishing system was cut through to the metal.

Panels were coated with a prime coat similar to that described in this example which did not contain any vinyl acetate polymer, then coated with the methyl methacrylate lacquer of this example as described hereinbefore. When the tape test was performed on these panels, about from 40 to 60% of the coating under the tape came off on the tape. The topcoat on these panels also flaked off when it was scraped with a knife blade.

The panels of this example which were topcoated with methyl methacrylate lacquer and undercoated with the composition of this invention containing a polymer of vinyl acetate showed no blistering after being immersed in a water bath at 37° C. for 1 week. The finishing system also showed no deterioration after being exposed to the weather for 3 months in Florida. The gloss and durability of the finishing system was excellent.

EXAMPLE II

An undercoat composition was prepared from the materials and by the procedure shown in Example I; however, about 8 parts of vinyl acetate homopolymer per 100 parts of resin binder were substituted for the copolymer used in that example. The homopolymer used in the composition had a molecular weight of about 10,000.

The undercoat composition of this example was applied to steel panels and topcoated as described in Example I. The resulting finishing system had properties similar to those of the system shown in Example I.

EXAMPLE III

An undercoat composition was prepared from the materials and by the procedure outlined in Example I. The proportions of constituents in the resin binder were:

| | Parts |
|---|---|
| Alkyd resin | 83 |
| Butylated urea-formaldehyde resin | 5 |
| Vinyl acetate/di(2-ethyl hexyl) maleate copolymer | 2 |
| Esterified epoxyhydroxy polyether resin | 10 |
| | 100 |

The undercoat composition of this example had properties comparable to those of the preceding examples.

EXAMPLE IV

An undercoat composition was prepared by milling together pigment, a polymer of vinyl acetate, a small portion of alkyd resin and solvent, then mixing therewith butylated urea-formaldehyde resin and esterified epoxyhydroxy polyether resin as described in Example I. The undercoat composition had the following formulation.

| | Parts |
|---|---|
| Resin Binder: | |
|   Alkyd resin (Similar to Example I) | 65.2 |
|   Butylated urea-formaldehyde resin (Similar to Example I) | 5.4 |
|   Vinyl acetate/di(2-ethyl hexyl) maleate copolymer (Similar to Example I) | 20.2 |
|   Esterfied epoxyhydroxy polyester resin (Similar to Example I) | 9.2 |
| Pigment: | |
|   $Fe_2O_3$ | 102.1 |
|   $Al_2O_3.SiO_2$ | 161.0 |
|   Silica | 55.2 |
| Solvent: | |
|   Aromatic hydrocarbon mixture (boiling range 165–175° C.) | 107.8 |
|   Xylene | 65.0 |
|   Butanol | 3.5 |
| | 594.6 |

When this composition was applied under a methyl methacrylate lacquer topcoat as described in Example I, the resulting finishing system had the same excellent properties, particularly adhesion, as those of the systems in the preceding examples.

If desired, the esterified epoxyhydroxy polyether resin can be omitted from the undercoat composition of this example, thereby yielding a coating composition containing about 72 parts of oil modified alkyd resin, about 6 parts of butylated urea-formaldehyde resin and about 22 parts of vinyl acetate copolymer. The adhesion of methacrylate lacquers to an undercoat of this composition is greatly superior to the adhesion of the lacquer to conventional alkyld/amino-aldehyde undercoats which do not contain any polymer of vinyl acetate.

EXAMPLE V

Three undercoat compositions were prepared by the procedure outlined in Example IV. Except for the formulation of the resin binder, each undercoat in this example had the same composition as the undercoat in Example IV. The composition of the resin binder in the undercoats was:

| | Parts |
|---|---|
| Alkyd resin (Similar to Example I) | 64.0 |
| Butylated urea-formaldehyde resin (Similar to Example I) | 5.4 |
| Copolymer of vinyl acetate | 21.4 |
| Esterified epoxyhydroxy polyether resin | 9.2 |
| | 100.0 |

The polymers of vinyl acetate used in the undercoats were:

| Sample | Copolymerized Monomer | Weight Ratio of Vinyl Acetate to Copolymerized Monomer |
|---|---|---|
| A | vinyl stearate | 93/7 |
| B | lauryl maleate | 97/3 |
| C | lauryl maleate | 94/6 |

A 50% solution of each of the copolymers of vinyl acetate in toluene had a Gardner Holdt viscosity within the range of about M to Z.

The undercoat compositions of this example were applied to steel panels, baked, then topcoated with methyl methacrylate lacquer as described hereinbefore. Each of the resulting finishing systems showed the same excellent adhesion, blister resistance, weather resistance, durability and gloss as the systems of the preceding examples.

I claim:

1. A coating composition which comprises pigment, solvent and a resin binder having as essential constituents oil modified alkyd resin, amino-aldehyde resin and about from 1 to 50% by weight of at least one polymer of vinyl acetate containing at least about 60% by weight of polymerized vinyl acetate said oil modified alkyd resin and said amino-aldehyde resin being present in a weight ratio of about from 95:5 to 60:40, respectively.

2. A composition of claim 1 wherein said vinyl acetate polymer is a homopolymer of vinyl acetate.

3. A composition of claim 1 wherein said vinyl acetate polymer is a copolymer of vinyl acetate and another ethylenically unsaturated monomer copolymerizable therewith.

4. A coating composition which comprises pigment, solvent and a resin binder having as essential constituents oil modified alkyd resin, amino-aldehyde resin, up to about 10% by weight of epoxyhydroxypolyether resin, and about from 1 to 50% by weight of at least one polymer of vinyl acetate containing at least about 60% by weight of polymerized vinyl acetate said oil modified alkyd resin and said amino-aldehyde resin being present in a weight ratio of about from 95:5 to 60:40, respectively.

5. A coating composition which comprises pigment, solvent and a resin binder having as essential constituents about from 60 to 80% by weight of oil-modified alkyd resin, about from 5 to 10% by weight of amino-aldehyde resin, about from 5 to 10% by weight of esterified epoxyhydroxy polyether resin, and about from 5 to 20% of at least one polymer of vinyl acetate containing at least about 60% by weight of polymerized vinyl acetate.

6. A coating composition comprising solvent, a resin binder having as essential constituents about from 60 to 80% by weight of oil modified alkyd resin, about from 5 to 10% by weight of amino-aldehyde resin, about from 5 to 10% by weight of esterified epoxyhydroxy polyether resin and about from 5 to 20% by weight of at least one vinyl acetate polymer containing at least about 60% by weight of polymerized vinyl acetate, and pigment in an amount greater than the critical pigment volume concentration for said pigment.

7. An article having a multi-layer finishing system which comprises an undercoat and a superposed dried topcoat of methyl methacrylate lacquer in adherent contact therewith, said undercoat comprising pigment and a resin binder having as essential constituents oil modified alkyd resin, amino-aldehyde resin and about from 1 to 50% by weight of at least one polymer of vinyl acetate containing at least about 60% by weight of polymerized vinyl acetate said oil modified alkyd resin and said amino-aldehyde resin being present in a weight ratio of about from 95:5 to 60:40, respectively.

8. An article of claim 7 wherein said vinyl acetate polymer in said undercoat is a homopolymer of vinyl acetate.

9. An article of claim 7 wherein said vinyl acetate polymer in said undercoat is a copolymer of vinyl acetate and another ethylenically unsaturated monomer copolymerizaable therewith.

10. An article having multi-layer finishing system which comprises an undercoat and a superposed dried topcoat of methyl methacrylate lacquer in adherent contact therewith, said undercoat comprising pigment and a resin binder having as essential constituents oil modified alkyd resin, amino-aldehyde resin, up to about 10% by weight of epoxyhydroxy polyether resin, and about from 1 to 50% by weight of at least one polymer of vinyl acetate containing at least about 60% by weight of polymerized vinyl acetate said oil modified alkyd resin and said amino-aldehyde resin being present in a weight ratio of about from 95:5 to 60:40, respectively.

11. An article having a multi-layer finishing system which comprises an undercoat and a superposed dried topcoat of methyl methacrylate lacquer in adherent contact therewith, said undercoat comprising pigment, a resin binder having as esesntial constituents about from 60 to 80% by weight of oil-modified alkyd resin, about from 5 to 10% by weight of amino-aldehyde resin, about from 5 to 10% by weight of esterified epoxyhydroxy polyether resin and about from 5 to 20% of at least one polymer of vinyl acetate containing at least about 60% by weight of polymerized vinyl acetate.

12. An article having multi-layer finishing system which comprises an undercoat and a superposed dried topcoat of methyl methacrylate lacquer in adherent contact therewith, said undercoat comprising a resin binder having as essential constituents about from 60 to 80% by weight of oil modified alkyd resin, about from 5 to 10% by weight of amino-aldehyde resin, about from 5 to 10% by weight of esterified epoxyhydroxy polyether resin and about from 5 to 20% by weight of at least one vinyl acetate polymer containing at least about 60% by weight of polymerized vinyl acetate, and pigment in an amount greater than the critical pigment volume concentration for said pigment.

13. A metal article coated with the finishing system of claim 7 wherein said methyl methacrylate polymer component of said methyl methacrylate lacquer has a relative viscosity of 1.117 to 1.196.

14. A process which comprises milling together pigment, solvent and about from 1 to 50 parts by weight of at least one polymer of vinyl acetate containing at least about 60% by weight of polymerized vinyl acetate and mixing therewith oil-modified alkyd resin and amino-aldehyde resin in a weight ratio of about from 95:5 to 60:40, respectively to yield a coating composition having 100 parts by weight of resin binder.

15. A process which comprises milling together pigment, solvent and about from 1 to 50 parts by weight of at least one polymer of vinyl acetate containing at least about 60% by weight of polymerized vinyl acetate and mixing therewith oil modified alkyd resin and amino-aldehyde resin in a weight ratio of about from 95:5 to 60:40, respectively and up to 10 parts by weight of esterified epoxyhydroxy polyether resin to yield a coating composition having 100 parts by weight of resin binder.

16. A coating composition which comprises pigment, solvent and a resin binder having as essential constituents oil modified alkyd resin, amino-aldehyde resin and about from 5 to 20% by weight of at least one polymer of about from 95 to 85% by weight of vinyl acetate and about from 5 to 15% by weight of at least one diester of maleic acid with at least one 4 to 18 carbon atom alkanol, said oil modified alkyd resin and said amino-aldehyde resin being present in a weight ratio of about from 95:5 to 60:40, respectively.

References Cited in the file of this patent

UNITED STATES PATENTS

| | | |
|---|---|---|
| 2,343,997 | Powell et al. | Mar. 14, 1944 |
| 2,424,730 | Balassa | July 29, 1947 |
| 2,567,678 | Morrison | Sept. 11, 1951 |
| 2,681,322 | Auer | June 15, 1954 |
| 2,709,664 | Evans | May 31, 1955 |
| 2,720,500 | Cody | Oct. 11, 1955 |
| 2,734,876 | Bradley | Feb. 14, 1956 |
| 2,778,745 | La Berge et al. | Jan. 22, 1957 |
| 2,782,131 | Johnson | Feb. 19, 1957 |
| 2,847,323 | Evans et al. | Aug. 12, 1958 |
| 2,876,135 | Levine | Mar. 3, 1959 |

FOREIGN PATENTS

| | | |
|---|---|---|
| 154,146 | Australia | Nov. 16, 1953 |

OTHER REFERENCES

Rohm and Haas: Acryloid and Rhoflex, 1953, page 8 relied on.

Von Fischer et al.: "Organic Protective Coatings," Reinhold, 1953, page 36.

UNITED STATES PATENT OFFICE
CERTIFICATE OF CORRECTION

Patent No. 2,956,902                             October 18, 1960

Mortimer Greif

It is hereby certified that error appears in the printed specification of the above numbered patent requiring correction and that the said Letters Patent should read as corrected below.

Column 7, line 57, for "polyester" read -- polyether --; column 9, line 47, for "esesntial" read -- essential --.

Signed and sealed this 11th day of April 1961.

(SEAL)
Attest:

ERNEST W. SWIDER
Attesting Officer

ARTHUR W. CROCKER
Acting Commissioner of Patents